United States Patent
Suciu et al.

(10) Patent No.: US 10,006,364 B2
(45) Date of Patent: Jun. 26, 2018

(54) GAS TURBINE ROTORS

(71) Applicant: UNITED TECHNOLOGIES CORPORATION, Farmington, CT (US)

(72) Inventors: Gabriel L. Suciu, Glastonbury, CT (US); Brian D. Merry, Andover, CT (US); James D. Hill, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 314 days.

(21) Appl. No.: 14/813,284

(22) Filed: Jul. 30, 2015

(65) Prior Publication Data
US 2016/0053688 A1  Feb. 25, 2016

Related U.S. Application Data

(60) Provisional application No. 62/039,798, filed on Aug. 20, 2014.

(51) Int. Cl.
*F01D 5/06* (2006.01)
*F02C 7/12* (2006.01)
(Continued)

(52) U.S. Cl.
CPC .............. *F02C 7/12* (2013.01); *F01D 5/066* (2013.01); *F01D 5/084* (2013.01); *F01D 5/087* (2013.01); *F01D 11/001* (2013.01); *F01D 25/12* (2013.01); *F01D 25/24* (2013.01); *F02C 3/04* (2013.01); *F02C 7/20* (2013.01); *F04D 29/164* (2013.01); *F04D 29/321* (2013.01);
(Continued)

(58) Field of Classification Search
None
See application file for complete search history.

(56) References Cited

U.S. PATENT DOCUMENTS

| 2,656,147 A * | 10/1953 | Brownhill | ............... F01D 5/084 |
| | | | 416/193 A |
| 4,730,982 A * | 3/1988 | Kervistin | ................ F01D 5/084 |
| | | | 415/115 |

(Continued)

FOREIGN PATENT DOCUMENTS

| EP | 0250323 A1 | 12/1987 |
| EP | 2586969 A2 | 5/2013 |

(Continued)

OTHER PUBLICATIONS

English Abstract for EP0250323A1—Dec. 23, 1987; 1 pg.
(Continued)

*Primary Examiner* — Woody Lee, Jr.
*Assistant Examiner* — Theodore Ribadeneyra
(74) *Attorney, Agent, or Firm* — Cantor Colburn LLP

(57) ABSTRACT

A rotor for a gas turbine engine includes a cold shell, a hot shell, and a spoke. The spoke is connected to and extends radially outward from the cold shell. The hot shell is connected to the cold shell by the spoke and includes an axially extending outboard segment and an axially extending inboard segment. The outboard segment is connected to the inboard segment and the inboard segment is disposed radially inboard of the outboard segment for sealably engaging a stator blade shroud.

18 Claims, 4 Drawing Sheets

(51) Int. Cl.
*F01D 5/08* (2006.01)
*F01D 25/24* (2006.01)
*F02C 3/04* (2006.01)
*F02C 7/20* (2006.01)
*F01D 11/00* (2006.01)
*F01D 25/12* (2006.01)
*F04D 29/32* (2006.01)
*F04D 29/16* (2006.01)
*F04D 29/54* (2006.01)
*F04D 29/58* (2006.01)

(52) U.S. Cl.
CPC ......... *F04D 29/545* (2013.01); *F04D 29/584* (2013.01); *F05D 2220/32* (2013.01); *F05D 2260/221* (2013.01); *Y02T 50/676* (2013.01)

(56) References Cited

U.S. PATENT DOCUMENTS

| | | | |
|---|---|---|---|
| 5,054,996 A * | 10/1991 | Carreno | F01D 11/18 415/115 |
| 6,655,920 B2 * | 12/2003 | Beutin | F01D 5/063 415/199.5 |
| 8,932,007 B2 * | 1/2015 | Khanin | F01D 5/084 415/116 |
| 2011/0027093 A1 * | 2/2011 | Delapierre | F01D 5/06 416/220 R |
| 2012/0328414 A1 * | 12/2012 | Coutandin | F01D 5/081 415/116 |
| 2014/0056686 A1 * | 2/2014 | Zhang | F01D 5/087 415/1 |

FOREIGN PATENT DOCUMENTS

| | | |
|---|---|---|
| FR | 2895021 A1 | 6/2007 |
| FR | 2953251 A1 | 6/2011 |

OTHER PUBLICATIONS

English Abstract for FR2895021A1—Jun. 22, 2007; 2 pgs.
English Abstract for FR2953251A1—Jun. 3, 2011; 2 pgs.
European Search Report for Application No. 15181809.3-1610; dated Apr. 25, 2016; 7 pgs.

* cited by examiner

GAS TURBINE ROTORS

CROSS-REFERENCE TO RELATED APPLICATION

This application claims the benefit of priority under 35 U.S.C. § 119(e) to U.S. Provisional Application No. 62/039,798, filed Aug. 20, 2014, which is incorporated herein by reference in its entirety.

BACKGROUND OF THE INVENTION

1. Field of the Invention

The present disclosure relates to gas turbine engines, and more particularly to rotors for gas turbine engines.

2. Description of Related Art

Gas turbine engines commonly include a rotor portion circumferentially surrounded by a stator portion. The rotor and stator portions can be arranged in stages and each stage can have circumferential arrays of rotor blades and stator blades sharing common axial positions. The stator blades generally extend radially inward from the stator portion and are fixed in relation to the rotor. The rotor blades generally extend radially outward from the rotor portion and are rotatable in relation to the stator blades. Airfoils of the stator blades direct air entering the stage into the rotor blades while rotation of the rotor portion rotates the rotor blades, increasing the pressure and temperature of air traversing the rotor stage.

Some gas turbine engines have rotors constructed with discrete rotor and rotor spacer structures. Axially adjacent rotor structures are separated by an intervening rotor spacer such that abutting axial faces of the rotor and rotor spaces contact one another. Axial ties such as bolts or tie rods typically urge the rotor and rotor spacers together, thereby limiting fluid leakage from the rotor exterior to the rotor interior. This prevents relatively high-pressure gases traversing the rotor exterior from infiltrating interior cavities of the rotor with lower pressures.

Such conventional methods and systems have generally been considered satisfactory for their intended purpose. However, there is still a need in the art for improved rotors that allow for improved engine efficiency. The present disclosure provides a solution for this need.

SUMMARY OF THE INVENTION

A rotor for a gas turbine engine includes a cold shell, a hot shell, and a spoke. The spoke is connected to the cold shell and extends radially outward from the cold shell. The hot shell is connected to the cold shell by the spoke and includes an axially extending outboard segment and an axially extending inboard segment. The inboard segment is connected to the outboard segment and is disposed radially inboard of the outboard segment for sealably engaging a stator blade shroud.

In certain embodiments the inboard segment can include a sealing structure extending radially outward from the inboard segment. The sealing structure can include a knife-edge extending circumferentially about the hot shell configured. The sealing structure can also include a plurality of knife-edges. It is contemplated that one or more of the knife-edges are axially offset from a first of the knife-edges along an axial length of the inboard segment.

In accordance with certain embodiments, a radially inner surface of the hot shell and a radially outer surface of the cold shell can bound a coolant channel defined between the hot shell and the cold shell. The inboard segment of the hot shell can be integral with the outboard segment of the hot shell such that the underlying portion of the coolant channel is fluidly isolated from the rotor exterior, e.g. from a core gas path bounded by a radially outer surface of the hot shell. The coolant shell can be a first coolant channel, and a second coolant channel can be defined between the surfaces and separated from the first coolant channel by the spoke. It is contemplated that a stress relief feature can be defined in the inboard and outboard segments and arranged adjacent to the coolant channel.

It is also contemplated that in certain embodiments the outboard segment can be a first outboard segment and the hot shell can include a second outboard segment. The second outboard segment can be connected to the inboard segment on an end axially opposite the first outboard segment. A first rotor blade can also be connected to the first outboard segment and a second rotor blade can be connected to the second outboard segment. The inboard segment can also be a first inboard segment and the hot shell can include a second inboard segment connected to the outboard segment on an end axially opposite the first inboard segment. An aft transition segment can couple the outboard segment to the first inboard segment. A forward transition segment can also couple the forward transition segment to the second inboard segment.

A compressor module for a gas turbine engine includes a rotor and a stator shroud. The rotor includes a cold shell, a spoke connected to the cold and extending radially outward therefrom, and a hot shell connected to the cold shell by the spoke. The hot shell includes an axially extending outboard segment connected to an axially extending inboard segment. The stator shroud is arranged radially outboard of inboard segment and circumferentially surrounds the inboard segment of the rotor.

A gas turbine engine includes a rotor and a stator circumferentially surrounding the rotor and defining a core flow path between the stator and rotor. The rotor includes a cold shell, a spoke connected to the cold shell and extending radially outward from the cold shell, and a hot shell connected to the cold shell by the spoke. The hot shell includes an axially extending outboard segment connected to an axially extending inboard segment integrally connected to the outboard segment such that the hot shell fluidly isolates the core flow path from an interior of the rotor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
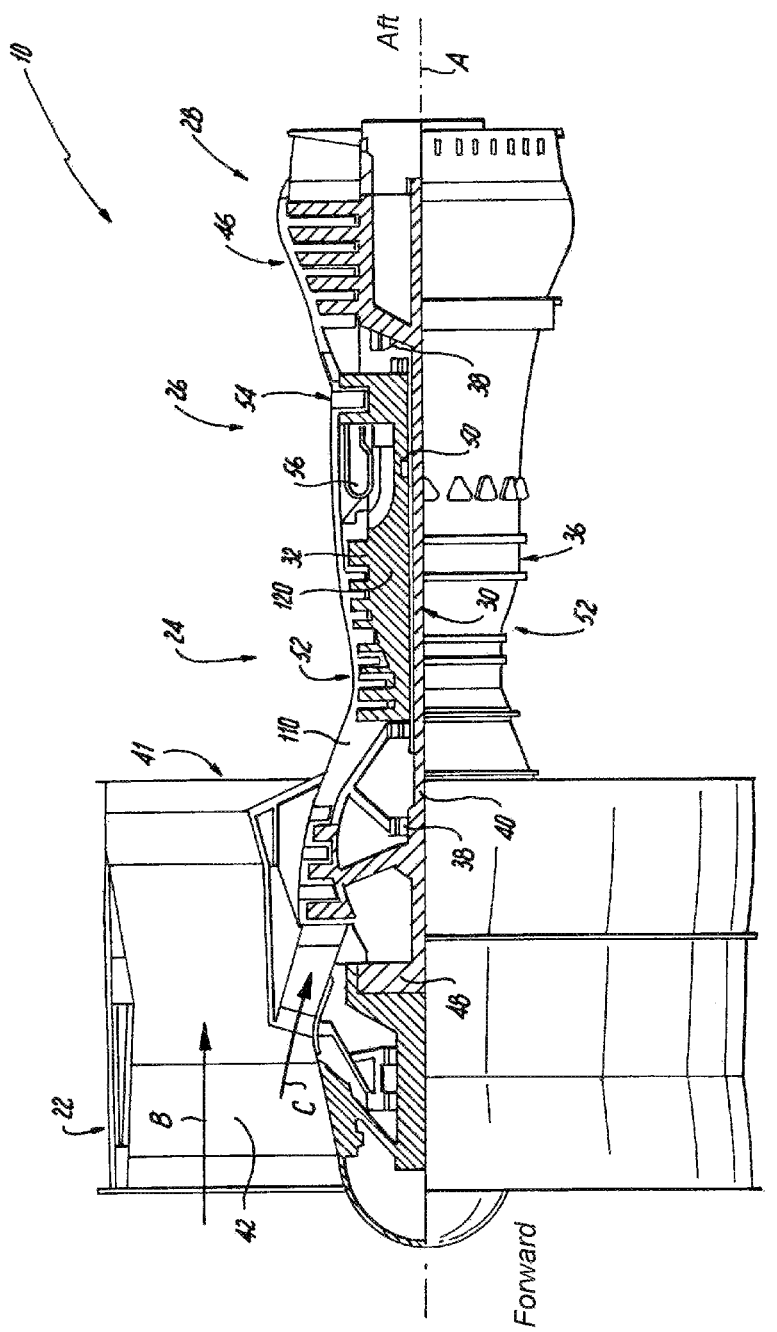
FIG. 1 is a schematic, cross-sectional side elevation view of an exemplary embodiment of a gas turbine engine constructed in accordance with the present disclosure, showing a gas turbine engine with a compressor module.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 10. Other embodiments of gas turbine in accordance with the disclosure, or aspects thereof, are provided in FIGS. 2-4, as will be described. The rotor and rotor stage assemblies described herein can be used for aircraft main engines and/or aircraft auxiliary power units as well as for terrestrial and marine-based gas turbine engines.

With reference to FIG. 1, gas turbine engine 10 is shown schematically. As described herein, gas turbine engine 10 is a two-spool turbofan engine that generally incorporates a fan section 22, a compressor section 24 including one or more compressor modules, a combustor section 26 and a turbine section 28. Alternative engines might include an augmentor section (not shown) among other systems or features.

Fan section 22 drives air along a bypass flow path B. Compressor section 24 drives air along a core flow path C for compression and communication into combustor section 26. Combustor section 26 introduces fuel into the compressed air, ignites the fuel-air mixture, and generates a flow of high-pressure combustion products. Combustor section 26 communicates the high-pressure combustion products to turbine section 28. Turbine section 28 expands the high-pressure combustion products, extracts mechanical work therefrom, and rotates fan section 22 and compressor section 24. Although depicted as a turbofan gas turbine engine, it is to be understood and appreciated that the concepts described herein are not limited to use with turbofans as the teachings may be applied to other types of turbine engines, such as three-spool gas turbine engine architectures.

Gas turbine engine 10 generally includes a core with an axially stacked stator 110 and a rotor 120. Rotor 120 is divided into a low-speed spool 30 and a high-speed spool 32 mounted for rotation about an engine rotation axis R relative to an engine static structure 36 including stator 110. Low-speed spool 30 and high-speed spool 32 are supported via several bearing systems 38 for rotation in relation to engine static structure 36. It should be understood that various bearing systems 38 at various locations may alternatively or additionally be provided.

Low-speed spool 30 generally includes an inner shaft 40 that interconnects a fan 42, a low-pressure compressor module 44, and a low-pressure turbine 46. Inner shaft 40 may be connected to fan 42 directly or through a geared architecture 48 configured to drive fan 42 at a rotation speed lower than a rotation speed of low-speed spool 30, such as with a gear reduction ratio of, for example, about at least 2.3:1. High-speed spool 32 includes an outer shaft 50 that interconnects a high-pressure compressor module 52 and high-pressure turbine 54. Combustor section 26 includes a combustor 56 arranged between high-pressure compressor module 52 and high-pressure turbine 54. Inner shaft 40 and outer shaft 50 are concentric and configured for rotation about engine rotation axis R that is collinear with respective longitudinal axes of inner shaft 40 and outer shaft 50.

Gas turbine engine 10 is typically assembled in build groups or modules that form a succession of axially stacked stages. In the illustrated embodiment, low-pressure compressor 44 includes three stages, high-pressure compressor module 52 includes eight stages, high-pressure turbine 54 includes two stages, and low-pressure turbine includes five stages, respectively, stacked in an axial arrangement. It should be appreciated, however, that compressor modules with any number of stages will benefit herefrom. Further, other gas turbine architectures such as three-spool architecture with an intermediate spool will also benefit herefrom as well.

Figure 2:
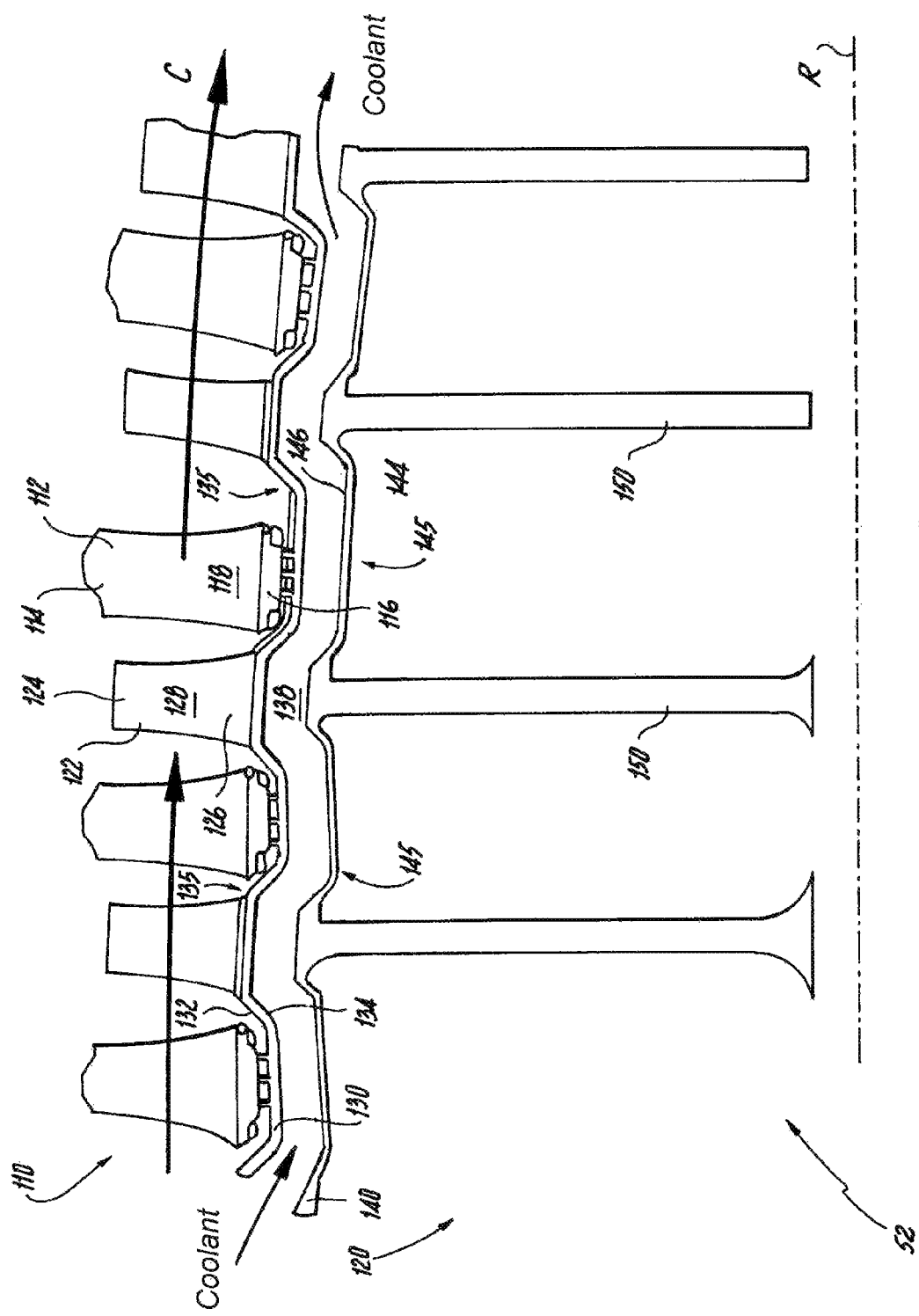
FIG. 2 is a cross-sectional side elevation view of the compressor module of FIG. 1, showing portions of a stator and rotor of the compressor module.

With reference to FIG. 2, a portion of high-pressure compressor module 52 is shown. High-pressure compressor module 52 includes portions of stator 110 and a rotor 120. Stator 110 forms a portion of engine static structure 36 (shown in FIG. 1) and includes a plurality of stator blades 112. Stator blades 112 (only one identified in FIG. 2 for purposes of clarity) respectively include a radially outer root portion 114, a radially inner shroud portion 116, and an airfoil portion 118 connecting outer root portion 114 with shroud portion 116. Airfoil portion 118 is disposed within core flow path C. Shroud portion 116 is configured and adapted to sealably engage a rotatable surface portion of rotor 120 that is disposed radially inward, i.e. toward engine rotation axis, of shroud portion 116. Stator blades 112 are distributed into circumferential arrays, each array having a common axial position associated with a stage of high-pressure compressor module 52. It is to be understood and appreciated at least one stator blade stage of high-pressure compressor module 52 is a shrouded stator stage. Shrouding one or more stator blade stages within high-pressure compressor module 52 can improve engine efficiency by reducing backflow along core flow path C.

Rotor 120 includes a hot shell 130, a cold shell 140, a plurality of rotor disks 150, and a plurality of rotor blades 122. Rotor blades 122 (only one of which is identified in FIG. 2 for purposes of clarity) respectively include a radially outer tip portion 124, a radially inner root portion 126, and an airfoil portion 128 connecting tip portion 124 with root portion 126. Rotor blades 122 are distributed into circumferential arrays, each array having a common axial position associated with a stage of high-pressure compressor module 52. Airfoil portions 128 of rotor blades 122 are disposed within core flow path C and configured compressing air traversing core flow path C directed into airfoil portion 128 by airfoil portions 118 of stator blades 112 arranged immediately upstream of airfoil portion 128 as rotor 120 rotates about engine rotation axis A.

Hot shell 130 has a radially outer surface 132, a radially inner surface 134, and plurality of radially recessed inboard segments 135. Radially outer surface 132 bounds a portion of core flow path C. Radially inner surface 134 bounds a portion of a coolant channel 138 defined within rotor 120. Radially recessed inboard segments 135 form an axially extending serpentine profile with recesses configured and adapted to receive shroud portions of stator blades 112. A plurality of spokes 160 (shown in FIG. 3) extend radially between radially inner surface 134 of hot shell 130 and radially outer surface 146 of cold shell 140. Spokes 160 connect hot shell 130 with cold shell 140, thereby forming an outer rim of rotor 120.

Coolant channel 138 is in fluid communication with a coolant source (not shown) and cooled engine component, e.g. turbine section 28 (shown in FIG. 1). Coolant channel 138 conveys coolant aft between radially inner surface 134 of hot shell 130 and radially outer surface 142 of cold shell 140. This thermally insulates cold shell 140 from hot gases traversing core flow path C, reducing the magnitude of temperature and temperature change experienced by cold shell 140 during operation of gas turbine engine 10 (shown in FIG. 1).

In embodiments, cold shell 140 includes a plurality of radially recessed inboard segments 145 spacing apart rotor disks 150. Radially recessed inboard segments 145 of cold shell 140 are integrally formed with the rim portion of the rotor disk arranged immediately downstream. This can provide a coolant channel with relatively uniform flow area, thereby facilitating coolant flow through rotor 120.

Figure 3:
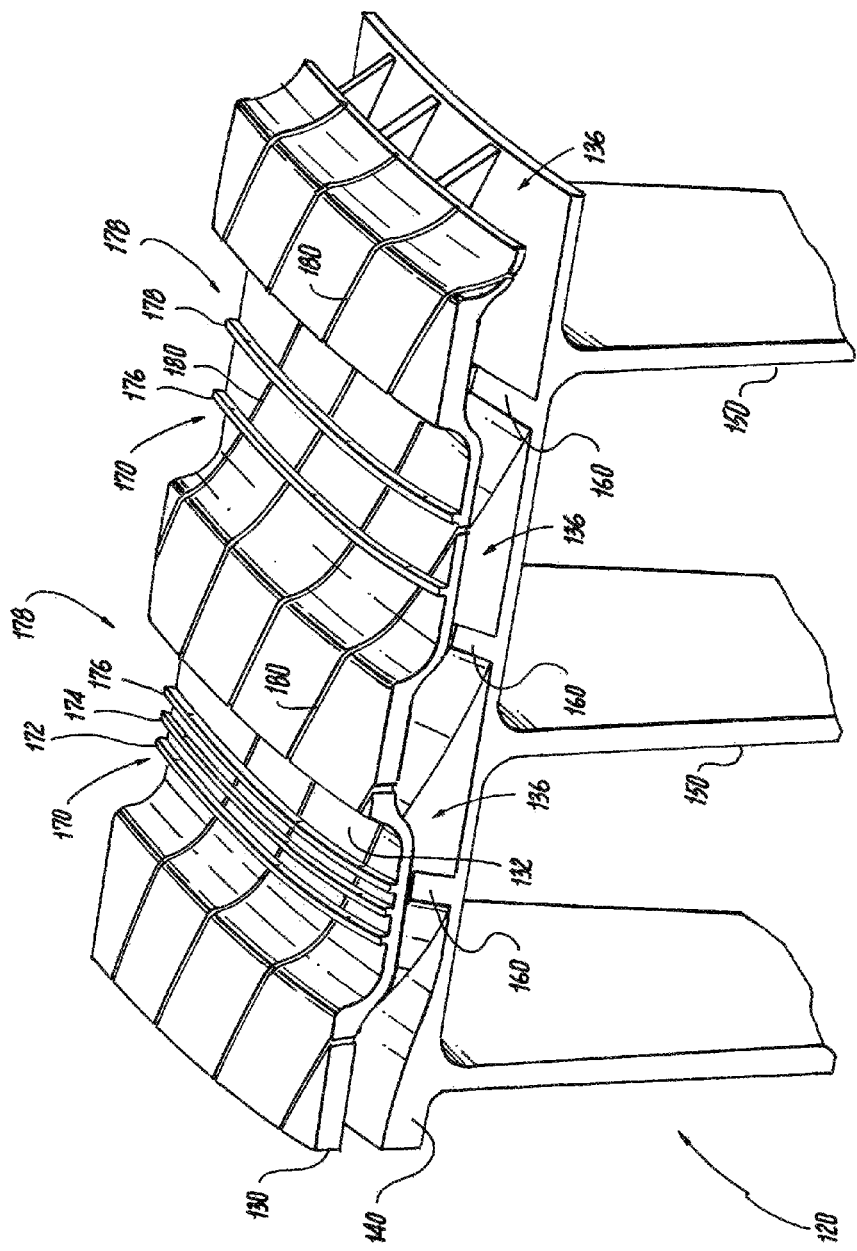
FIG. 3 is a perspective view of the rotor of FIG. 2, showing a hot shell, cold shell, and spoke of the rotor connecting the hot shell with the cold shell.

With reference to FIG. 3, rotor 120 is shown. Hot shell 130 includes a plurality of sealing structures 170. Sealing structures 170 are defined on respective radially recessed inboard segments 135 of hot shell 130. Respective sealing structures 170 extend circumferentially about radially outer surface 132 of hot shell 130 and are arranged radially inward from stator shroud portion 116 (shown in FIG. 2). Respective sealing structures 170 also include circumferential knife-edges axially staggered on respective radially recessed inboard segments 135.

As illustrated in FIG. 3, an upstream sealing structure 170 includes a first knife-edge 172, a second knife-edge 174 and a third knife-edge 174 while a downstream sealing structure 170 includes a fourth knife edge 176 and a fifth knife-edge 178 respectively configured and adapted for sealably engaging stator blade shroud portions. A downstream sealing structure 170 includes a pair of knife-edges. It is to be understood and appreciated that sealing structure 170 can include one, two, three or any number of knife-edge structures as suitable for an intended application.

Hot shell 130 also includes a plurality of stress relief features 180. Stress relief features 180 include a gap defined through a thickness of hot shell 130. Responsive to heating of hot shell 130 by gas traversing core flow path C, hot shell 130 expands. This reduces respective gap widths of stress relief features 180, thereby limiting thermal stress associated with the temperature exposure within hot shell 130. It is contemplated that stress relief feature 180 can be defined in hot shell 130 using an electrical discharge machining (EDM) process. Processes like EDM can sufficiently control the gap width and limit fluid communication between coolant channel 138 and core flow path C, potentially reducing efficiency losses associated with fluid leakage through stress relief features 180.

Figure 4:
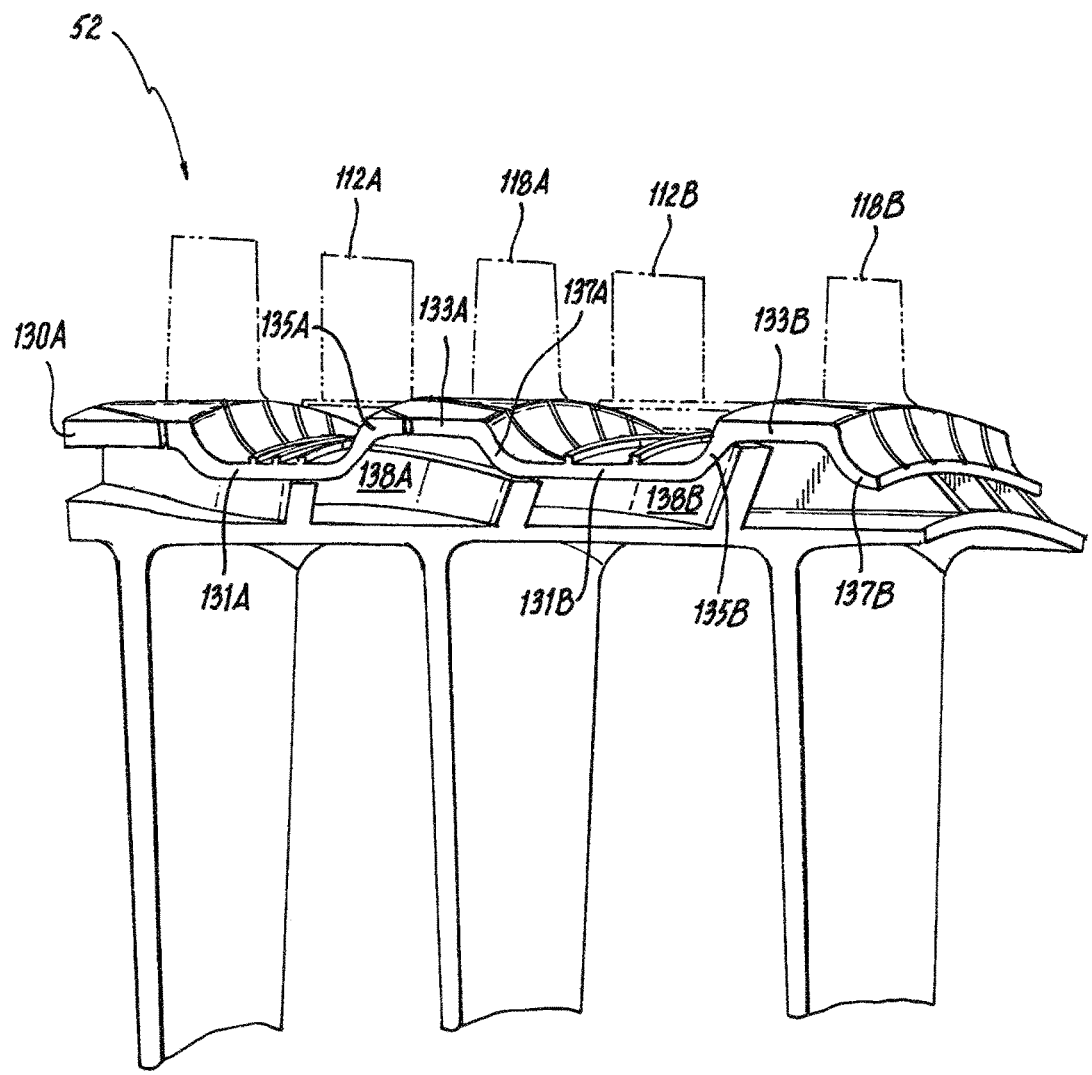
FIG. 4 is a cross-sectional perspective view of a portion of the rotor of FIG. 1, showing axially extending, radially outward segments and axially extending, radially inward segments of the hot shell.

With reference to FIG. 4, hot shell 130 is shown. Hot shell 130 includes a first inboard segment 131A, a second inboard segment 131B, a first outboard segment 133A, and a second outboard segment 133B. First inboard segment 131A is connected to first outboard segment 133A. First outboard segment 133A is connected to second inboard segment 131B. Second inboard segment 131B is connected to second outboard segment 133B. Connection between the inboard and outboard segments are such that the segments are integral with one another. This limits leakage through the circumferential interface between respective axially adjacent radially inner segments and the radially outer segments, minimizing fluid infiltration from core flow path C to a first coolant channel 138A and/or a second coolant channel 138B through hot shell 130. In embodiments, the circumferential interface is a leakless interface.

A first forward transition segment 135A couples first inboard segment 131A to first outboard segment 133A. A first aft transition segment 137A couples arranged on an axial end of first inboard segment 131A from first forward transition segment 135A connects first outboard segment 133A to second inboard segment 131B. A second forward transition segment 135B connects second inboard segment 131B to second outboard segment 133B.

Gas turbine engines have core flow paths that can convey gases with high temperatures and pressures. Such gases can impose relatively high thermal stress on the rotor structure, potentially limiting the low cycle fatigue expected life of the rotor. Embodiments of gas turbine rotors described herein include a radially inner cold shell and a radially outer hot shell connected by a spoke. The inner surface of the hot shell, outer surface of the cold shell, and spoke define a coolant channel. The coolant channel reduces thermal stress in the cold shell by flowing coolant across the cold shell. The coolant channel includes stress relief features that reduce thermal stress in the hot shell by accommodating thermal expansion and contraction of the hot shell. The hot shell can further include radially inboard and outboard segments integrally connected with one another, thereby sealably engage stator blade shrouds while limiting circumferential leak paths at interfaces between the radially inner and radially outer segments. This can provide superior sealing in comparison with conventional gas turbine rotors that include separate components that space axially adjacent rotor stages.

The methods and systems of the present disclosure, as described above and shown in the drawings, provide for gas turbine rotors with superior properties including accommodation of shrouded stator vanes with spoked rotors and/or reduced circumferential leakage paths. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A rotor for a gas turbine engine, comprising:
an integrally formed cold shell connected to a plurality of rotor discs extending from the cold shell;
a plurality of spokes connected to the cold shell and extending radially outwardly therefrom; and
a hot shell connected to the cold shell by the spokes, wherein the hot shell includes a first axially extending outboard segment integrally connected to an axially extending inboard segment and a second outboard segment integrally connected to the inboard segment on an end axially opposite the first outboard segment, the inboard segment being configured and adapted for sealably engaging a stator blade shroud.

2. A rotor as recited in claim 1, wherein the inboard segment includes a sealing structure extending radially outward from the inboard segment.

3. A rotor as recited in claim 2, wherein the sealing structure includes at least one knife-edge extending circumferentially about the inboard segment.

4. A rotor as recited in claim 1, wherein a radially inner surface of the hot shell and a radially outer surface of the cold shell bound a coolant channel arranged therebetween.

5. A rotor as recited in claim 4, wherein the inboard segment is axially integral with the first outboard segment such that an underlying portion of the coolant channel is fluidly isolated from the rotor exterior.

6. A rotor as recited in claim 4, wherein the coolant channel is a first coolant channel, and further including a second coolant channel separated from the first coolant channel by the spoke.

7. A rotor as recited in claim 4, further including a stress relief feature disposed at a radially outboard surface of the hot shell.

8. A rotor as recited in claim 1, further including a first stage rotor blade connected to the first outboard segment and a second stage rotor blade connected to the second outboard segment.

9. A rotor as recited in claim 1, wherein the inboard segment is a first inboard segment, and further including a second inboard segment connected to the first outboard segment on an end axially opposite the first inboard segment.

10. A rotor as recited in claim 9, further including an aft transition segment coupling the first outboard segment to the first inboard segment.

11. A rotor as recited in claim 10, further including a forward transition segment coupling the first outboard segment to the second inboard segment.

12. A compressor module for a gas turbine engine, comprising:
   a rotor, including:
   an integrally formed cold shell connected to a plurality of rotor discs extending from the cold shell;
   a plurality of spokes connected to the cold shell and extending radially outwardly therefrom; and
   a hot shell connected to the cold shell by the spokes, wherein the hot shell includes a first axially extending outboard segment integrally connected to an axially extending inboard segment and a second outboard segment integrally connected to the inboard segment on an end axially opposite the first outboard segment; and
   a stator shroud arranged radially outboard of the inboard segment and circumferentially surrounding the inboard segment.

13. A module as recited in claim 12, further including a sealing structure with at least one knife-edge, wherein the at least one knife-edge extends radially outward from and circumferentially about the inboard segment.

14. A module as recited in claim 12, wherein the inboard segment is axially integral with the first outboard segment such that an underlying portion of a coolant channel defined within the rotor is fluidly isolated from the rotor exterior.

15. A module as recited in claim 12, further including a first stage rotor blade connected to the first outboard segment and a second stage rotor blade connected to the second outboard segment, wherein the stator shroud is axially disposed between the first rotor blade and the second rotor blade.

16. A module as recited in claim 12, wherein the inboard segment is a first inboard segment, and further including a second inboard segment connected to the first outboard segment by a transition segment on an end axially opposite the first inboard segment.

17. A module as recited in claim 16, wherein the transition segment is arranged aft of the first outboard segment, and further including a forward transition segment coupling the first outboard segment to the first inboard segment.

18. A gas turbine engine, comprising:
   a rotor, including:
   an integrally formed cold shell connected to a plurality of rotor discs extending from the cold shell;
   a plurality of spokes connected to the cold shell and extending radially outwardly therefrom; and
   a hot shell connected to the cold shell by the spokes, wherein the hot shell includes a first axially extending outboard segment integrally connected to an axially extending inboard segment and a second outboard segment integrally connected to the inboard segment on an end axially opposite the first outboard segment; and
   a stator circumferentially surrounding the rotor and defining a core flow path therebetween, wherein the inboard segment is integrally connected to the first outboard segment and the second outboard segment such that the hot shell fluidly isolates the core flow path from an interior of the rotor.

* * * * *